(12) United States Patent
Miki et al.

(10) Patent No.: US 8,014,893 B2
(45) Date of Patent: Sep. 6, 2011

(54) METHOD OF MACHINING WORKPIECE WITH OFFSET TOOL

(75) Inventors: Yuji Miki, Wako (JP); Joji Kikuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 460 days.

(21) Appl. No.: 12/083,940

(22) PCT Filed: Oct. 27, 2006

(86) PCT No.: PCT/JP2006/321504
§ 371 (c)(1),
(2), (4) Date: Apr. 3, 2009

(87) PCT Pub. No.: WO2007/052553
PCT Pub. Date: May 10, 2007

(65) Prior Publication Data
US 2009/0187269 A1 Jul. 23, 2009

(30) Foreign Application Priority Data

Nov. 1, 2005 (JP) ................................ 2005-318428
Oct. 13, 2006 (JP) ................................ 2006-280211

(51) Int. Cl.
*G06F 19/00* (2011.01)
*B21D 53/78* (2006.01)
(52) U.S. Cl. ......... 700/176; 700/187; 700/193; 416/248
(58) Field of Classification Search .................. 700/159, 700/160, 164, 172–176, 186–193; 29/889.7; 416/223 R, 234–239, 248; 451/49–51; 408/186–194; 409/52
See application file for complete search history.

(56) References Cited

U.S. PATENT DOCUMENTS

| | | | | |
|---|---|---|---|---|
| 6,097,168 A | * | 8/2000 | Katoh et al. | 318/568.11 |
| 6,311,098 B1 | * | 10/2001 | Higasayama et al. | 700/159 |
| 6,604,015 B2 | * | 8/2003 | Iriguchi et al. | 700/187 |
| 6,647,314 B2 | * | 11/2003 | Kato et al. | 700/187 |

(Continued)

FOREIGN PATENT DOCUMENTS

JP 3-161209 A 7/1991

(Continued)

*Primary Examiner* — M. N. Von Buhr
(74) *Attorney, Agent, or Firm* — Birch, Stewart, Kolasch & Birch, LLP

(57) ABSTRACT

A groove (Da) extending in a Y-axis direction of a workpiece (D) is finish machined with an offset tool (T) that has a cross-section with a shape (L3) offset in a reducing direction by only a predetermined offset amount relative to a finished shape (L1) of the groove (Da) and that rotates around an axis of rotation parallel to a Z axis. Each time an incising step in which the offset tool (T) is relatively moved within the X-Z plane only by a predetermined distance on the circumference of an imaginary circle (C) having an initial position as its center and the offset amount (o) as its radius is carried out, a cutting step in which the entire length of the groove (Da) is cut while relatively moving the offset tool (T) in the Y-axis direction is carried out repeatedly. This enables the load imposed on the offset tool (T) to be suppressed compared with the case of a forming tool, which cuts a wide region of the groove (Da) of the workpiece (D) all at once, thus providing a method of machining a workpiece with an offset tool (T), the method allowing the durability of the offset tool (T) to be enhanced and the finishing precision of a machined face to be increased.

6 Claims, 9 Drawing Sheets

U.S. PATENT DOCUMENTS

| | | | |
|---|---|---|---|
| 6,772,039 B2 * | 8/2004 | Kakino et al. | 700/160 |
| 6,942,436 B2 * | 9/2005 | Kakino et al. | 409/84 |
| 7,007,382 B2 * | 3/2006 | Mantel | 29/889.2 |
| 7,050,883 B2 * | 5/2006 | Cho et al. | 700/188 |
| 7,101,126 B2 * | 9/2006 | Kakino et al. | 409/84 |
| 7,283,888 B2 * | 10/2007 | Evans et al. | 700/186 |
| 7,494,305 B2 * | 2/2009 | Riall et al. | 409/132 |
| 7,831,332 B2 * | 11/2010 | Diehl | 700/190 |
| 2007/0127995 A1 * | 6/2007 | Matsumura et al. | 409/132 |

FOREIGN PATENT DOCUMENTS

| | | |
|---|---|---|
| JP | 6-270006 A | 9/1994 |
| JP | 9-234617 A | 9/1997 |
| JP | 2000-158260 A | 6/2000 |
| JP | 3364168 B2 | 10/2002 |
| JP | 2004-507369 A | 3/2004 |
| WO | WO-2004/113000 A2 | 12/2004 |

* cited by examiner

COMPARATIVE EXAMPLE

METHOD OF MACHINING WORKPIECE WITH OFFSET TOOL

TECHNICAL FIELD

The present invention relates to a method of machining a workpiece with an offset tool, in which a groove extending in a Y-axis direction with a fixed cross-section containing a wave-shaped outline is formed by finish machining a roughly machined workpiece having a predetermined machining allowance for the groove with an offset tool that has a cross-section with a shape offset in a reducing direction by only a predetermined offset amount relative to the wave shape and that rotates around an axis of rotation parallel to a Z axis perpendicular to the Y axis.

BACKGROUND ART

A machining method in which, in order to assemble a root portion of a turbine rotor blade to an outer peripheral groove of a turbine disk, an arc-shaped root groove of the root portion of the turbine rotor blade is machined is known from Patent Publication 1 below. In the method disclosed in Patent Publication 1, the surface of a roughly machined arc-shaped root groove, which is to be finish machined by cutting, is divided into four, the finish machining by cutting is carried out by reciprocating a cutting tool twice, and by carrying out the finish machining in different incising directions from each other in four steps contained in the two reciprocations of the cutting tool, cutting vibration is suppressed, thus improving the machining precision and the machining speed.

Furthermore, a method of milling a groove having a Christmas tree-shaped cross-section for seating a turbine blade leg on the outer periphery of a turbine shaft is known from Patent Publication 2 below. In the method disclosed in Patent Publication 2, a groove is milled so as to have as a preliminary shape a Christmas tree-shaped cross-section, which narrows stepwise by carrying out three roughly machining steps, and the groove having a Christmas tree-shaped cross-section is finish machined by passing a tool once in a finish machining step.

Furthermore, a method of machining in a turbine rotor an arc-shaped rotor groove having a Christmas tree-shaped cross-section, and a counterbore for carrying out the machining are known from Patent Publication 3. In the method disclosed in Patent Publication 3, an arc-shaped rotor groove is roughly machined in a turbine rotor, and the rotor groove is then finish machined by linear sideways movement of a hanging bell-shaped counterbore.

Moreover, a blade groove-machining cutter for machining a blade groove for mounting a turbine blade on the outer periphery of a rotor is known from Patent Publication 4. The cutter disclosed in Patent Publication 4 has an edge portion formed along a plurality of steps corresponding to a Christmas tree-shaped blade groove, and the rake angle of the edge portion is increased stepwise toward a front step (forward end portion) and a rear step (root portion).

Patent Publication 1: Japanese Patent Application Laid-open No. 6-270006
Patent Publication 2: Japanese Patent Publication (PCT) No. 2004-507369
Patent Publication 3: Japanese Patent Application Laid-open No. 9-234617
Patent Publication 4: Japanese Patent No. 3364168

DISCLOSURE OF INVENTION

Problems to be Solved by the Invention

However, the tools of the inventions disclosed in Patent Publications 1 to 4 are so-called forming tools, and their shape coincides with the finally finished shape of the workpiece. In the case of such a forming tool, since the entire area of its cutting edge always contributes to cutting, the cutting resistance is large, and it is necessary to enhance the rigidity of the machining equipment and the tool. Furthermore, when 'feeding' is carried out, in which a tool is moved toward a wall face of a groove that is to be machined in a workpiece, since the diameter of the tool for machining a narrow part of the groove to be machined is smaller than the groove width by an amount corresponding to the feeding distance, in a case in which the groove to be machined has small dimensions there is the problem that the rigidity of the tool might be insufficient.

The present invention has been accomplished in the light of the above-mentioned circumstances, and it is an object thereof to enable a groove having a wave-shaped outline to be machined with good precision while minimizing the cutting load imposed on a tool.

Means for Solving the Problems

In order to attain the above object, according to a first aspect of the present invention, there is provided a method of machining a workpiece with an offset tool, in which a groove extending in a Y-axis direction with a fixed cross-section containing a wave-shaped outline is formed by finish machining a roughly machined workpiece having a predetermined machining allowance for the groove with an offset tool that has a cross-section with a shape offset in a reducing direction by only a predetermined offset amount relative to the wave shape and that rotates around an axis of rotation parallel to a Z axis perpendicular to the Y axis, the method comprising: a feeding step in which the offset tool is moved relative to the workpiece within an X-Z plane perpendicular to the Y axis only by the offset amount in a given direction from an initial position, a first cutting step in which the machining allowance is cut along the entire length of the groove while moving the offset tool relative to the workpiece in the Y-axis direction, an incising step in which the offset tool is moved relative to the workpiece within the X-Z plane only by a predetermined distance on the circumference of a circle having the initial position as the center thereof and the offset amount as a radius thereof, and a second cutting step in which the machining allowance is cut along the entire length of the groove while moving the offset tool relative to the workpiece in the Y-axis direction, wherein the incising step and the second cutting step are repeated a plurality of times.

According to a second aspect of the present invention, in addition to the first aspect, by repeating the feeding step and the first cutting step a plurality of times, the offset tool is moved relative to the workpiece within the X-Z plane perpendicular to the Y axis only by the offset amount in a given direction from the initial position.

According to a third aspect of the present invention, in addition to the first aspect, the second cutting step is carried out both when the offset tool moves relative to the workpiece in one direction along the Y-axis and when the offset tool moves relative thereto in the other direction along the Y-axis.

According to a fourth aspect of the present invention, in addition to the third aspect, the groove of the workpiece is a blade-mounting groove having a Christmas tree shape.

According to a fifth aspect of the present invention, in addition to the first aspect, the offset tool is moved relative to the workpiece within the X-Z plane by moving in synchronism a spindle head that supports the offset tool and is movable in the Z-axis direction and an indexing platen that supports the workpiece and is movable in an X-axis direction.

According to a sixth aspect of the present invention, in addition to the fifth aspect, the workpiece is a disk-shaped member comprising a plurality of radial grooves in the outer peripheral part, and is supported on the indexing platen so as to be capable of rotating around an axis parallel to the Y axis.

Effects of the Invention

In accordance with the first aspect of the present invention, since there are carried out the feeding step in which the offset tool is moved relative to the workpiece within the X-Z plane perpendicular to the Y axis only by the offset amount in a given direction from the initial position, the first cutting step in which the machining allowance is cut along the entire length of the groove while moving the offset tool relative to the workpiece in the Y-axis direction, the incising step in which the offset tool is moved relative to the workpiece within the X-Z plane only by a predetermined distance on the circumference of the circle having the initial position as its center and the offset amount as its radius, and the second cutting step in which the machining allowance is cut along the entire length of the groove while moving the offset tool relative to the workpiece in the Y-axis direction, only part of the machining allowance of the groove of the workpiece is cut in one first cutting step or one second cutting step; compared with a forming tool, which cuts a wide region of a groove of a workpiece all at once, the load imposed on the tool can be reduced. This enables the durability of the offset tool to be enhanced and the machining precision and the finishing precision of the machined face to be improved; moreover, a small-sized offset tool, for which the strength tends to be degraded, can be used; and even a small groove that is difficult for a forming tool can be machined.

In accordance with the second aspect of the present invention, when the offset tool is moved relative to the workpiece within the X-Z plane perpendicular to the Y axis only by the offset amount in a given direction from the initial position, since the feeding step and the first cutting step are repeated a plurality of times, the first cutting step, in which the amount cut from the workpiece is large, is divided into a plurality of steps, thus alleviating the cutting load imposed on the offset tool.

In accordance with the third aspect of the present invention, since the offset tool carries out cutting both when it moves relative to the workpiece in one direction along the Y-axis and when it moves relative thereto in the other direction, it is possible to machine the groove of the workpiece in a short time while minimizing the relative distance moved of the offset tool.

In accordance with the fourth aspect of the present invention, since the groove of the workpiece is a blade-mounting groove having a Christmas tree shape, due to the machining precision being improved, the workpiece and the blade can be mounted so that stress is not concentrated thereon even if, for example, centrifugal force is applied thereto.

In accordance with the fifth aspect of the present invention, since the spindle head that supports the offset tool and can move in the Z-axis direction and the indexing platen that supports the workpiece and can move in the X-axis direction are moved in synchronism with each other, the offset tool can move freely relative to the workpiece within the X-Z plane.

Furthermore, in accordance with the sixth aspect of the present invention, since the disk-shaped workpiece is supported on the indexing platen so that it can rotate around the axis parallel to the Y axis, a plurality of radial grooves can be efficiently machined in the outer peripheral face of the disk-shaped workpiece.

EXPLANATION OF REFERENCE NUMERALS AND SYMBOLS

D Turbine disk
Da Groove
o Offset amount
T Offset tool
13 Spindle head
14 Indexing platen

BEST MODE FOR CARRYING OUT THE INVENTION

Modes for carrying out the present invention are explained below by reference to embodiments of the present invention shown in the attached drawings.

EMBODIMENT 1

FIG. 1 to FIG. 7 show a first embodiment of the present invention.

Figure 1:
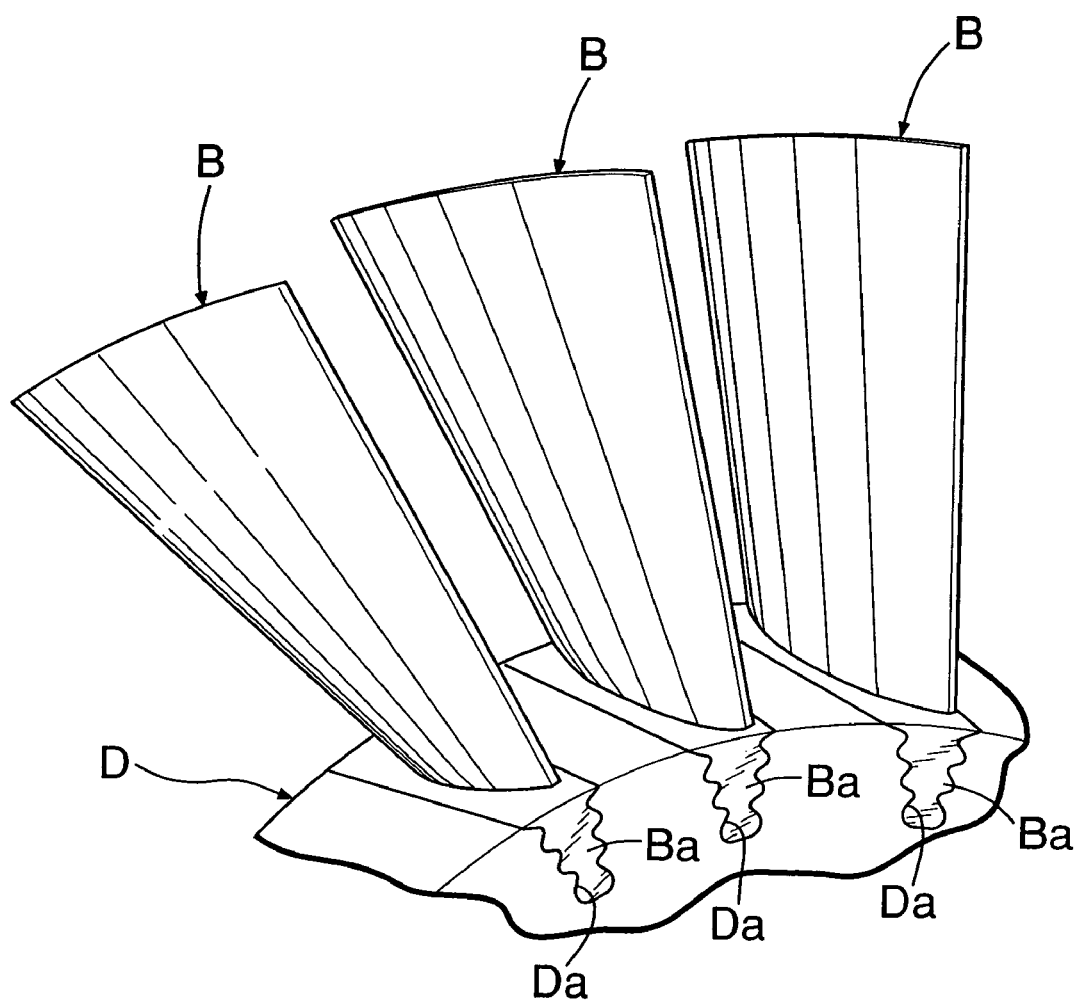
FIG. 1 is a perspective view of portions of turbine blades via which they are mounted on a turbine disk.

FIG. 1 shows a state in which a large number of turbine blades B are radially mounted on an outer peripheral part of a turbine disk D of a gas turbine engine, and each turbine blade B is securely supported so as to withstand a strong centrifugal force acting thereon when it is running by engaging a mounting portion Ba at its base with a groove Da of the turbine disk D. Since the shapes of the groove Da of the turbine disk D and the mounting portion of the turbine blade B resemble to the shape of a fir tree, the shape is called a Christmas tree.

Figure 2:
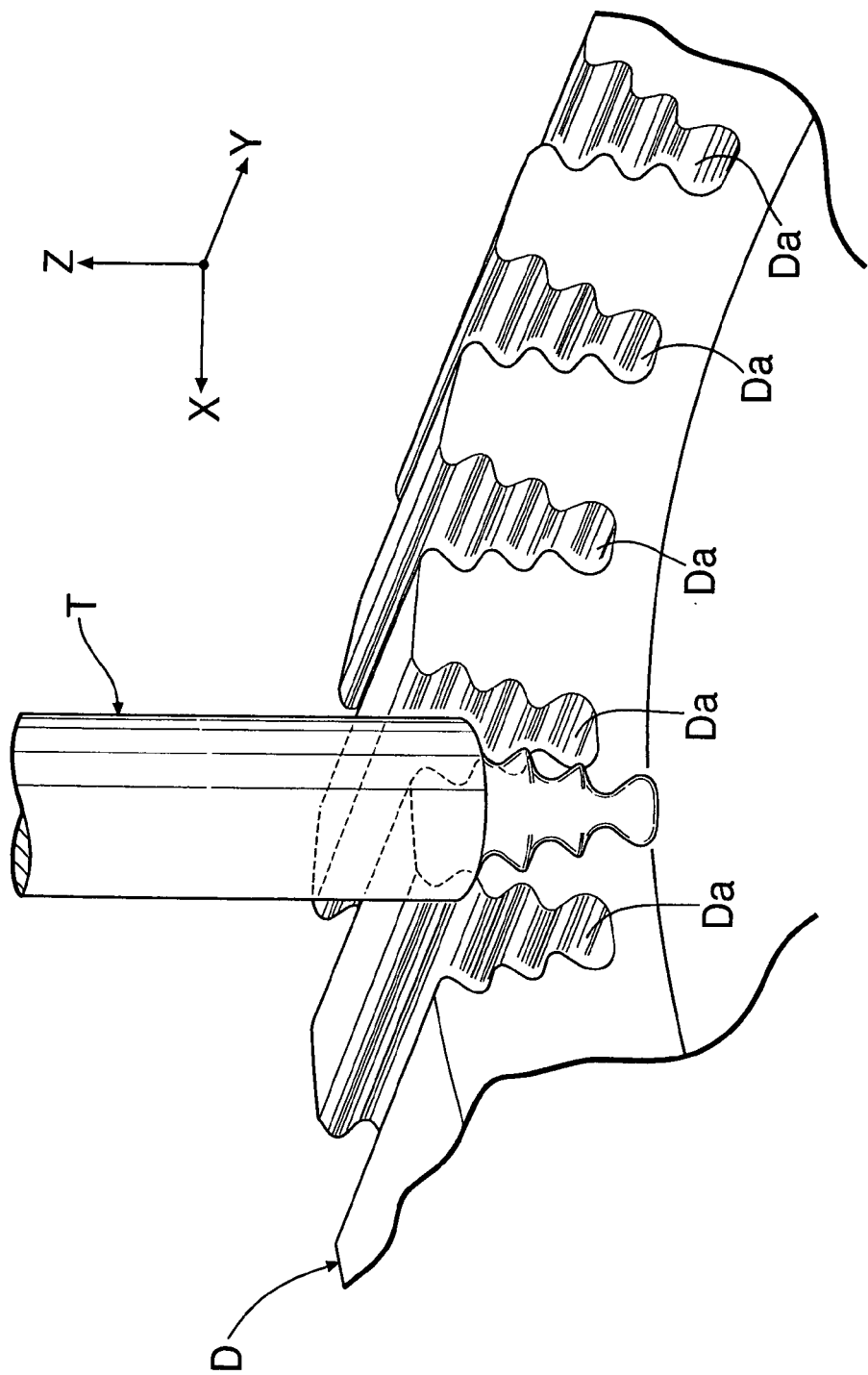
FIG. 2 is a perspective view of the turbine disk and an offset tool.

As shown in FIG. 2, the grooves Da having a Christmas tree shape are formed in the Y-axis direction at equal intervals in the circumferential direction in the outer peripheral part of the turbine disk D, which is disposed within the X-Z plane, and these grooves Da are machined by means of an offset tool T rotating around an axis of rotation parallel to the Z axis.

Figure 3:
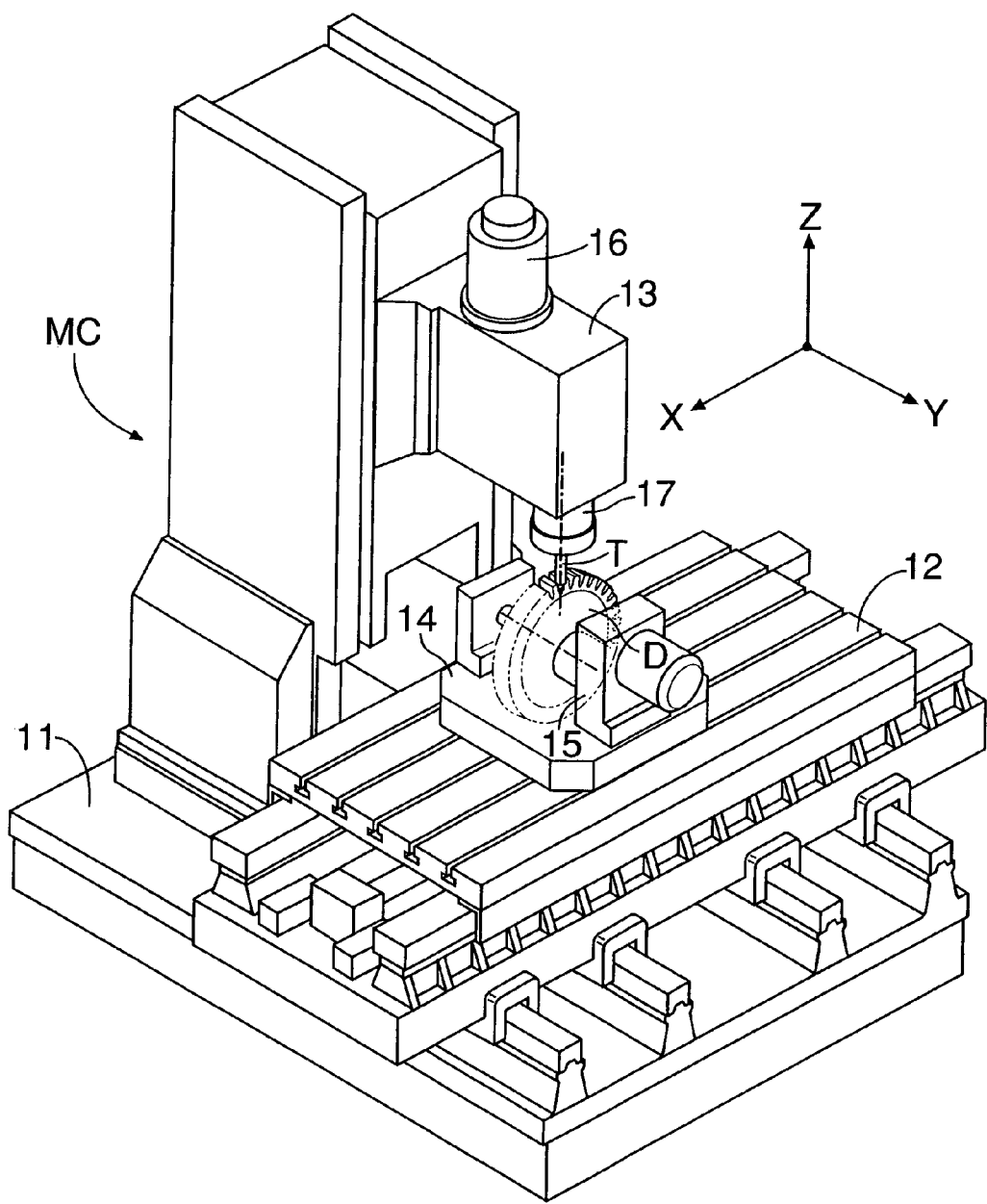
FIG. 3 is a perspective view of a general purpose machining center for cutting a groove of the turbine disk.

As shown in FIG. 3, a general purpose machining center MC for cutting the grooves Da of the turbine disk D includes a slide table 12 supported on a base table 11 so that it can freely move in the X-axis and Y-axis directions, which are perpendicular to each other, a spindle head 13 supported on the base table 11 so that it can freely move in the Z-axis direction, and an indexing platen 14 supported on the slide table 12. The turbine disk D, which is supported on a jig 15 provided on the indexing platen 14, can rotate by a predetermined angle at a time around an axis parallel to the Y axis. A spindle driven by a motor 16 is provided in the spindle head 13 along the Z-axis, and an offset tool T is mounted on the spindle axis via a chuck 17.

Therefore, by synchronizing movement of the indexing platen 14 in the X-axis direction with movement of the spindle head 13 in the Z-axis direction, the offset tool T can be moved relative to the turbine disk D within the X-Z plane, and by moving the indexing platen 14 in the Y-axis direction, the offset tool T can be moved relative to the turbine disk D in the Y-axis direction.

Figure 4:
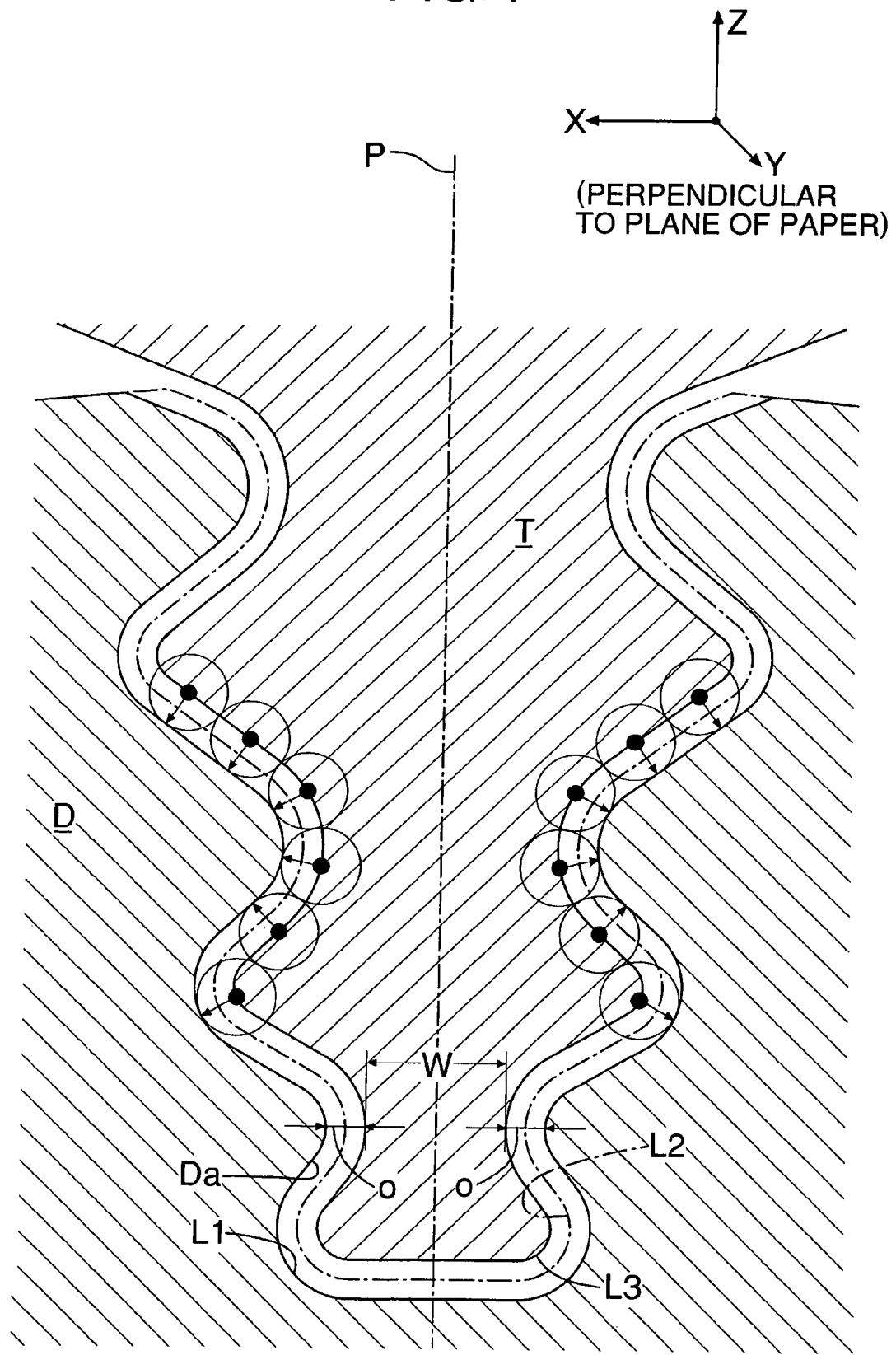
FIG. 4 is a diagram showing the shapes of the groove of the turbine disk and the offset tool.

A line L1 in FIG. 4 shows the finished shape of the groove Da of the turbine disk D, the groove Da having a bilaterally symmetrical wave-shaped outline relative to a plane of symmetry P extending in the radial direction of the turbine disk D. A line L2 shows a roughly finished shape prior to finish machining of the groove Da, and a section between the line L1 and the line L2 is a machining allowance that is to be cut by the offset tool T. In the present embodiment, the width of the machining allowance is about 0.15 mm. The groove Da with the machining allowance does not require a high surface precision and is therefore machined by, for example, electrical discharge machining.

A line L3 shows the outer shape of the offset tool T; the line L3, which is the outer shape of the offset tool T, is offset only by a predetermined offset amount o relative to the line L1, which is the finished shape of the groove Da. In this embodiment, the offset amount o is 0.30 mm. When a circle having a radius of the offset amount o is rolled along the line L1, which is the finished shape of the groove Da, the locus of the center of the circle becomes the line L3, which is the outer shape of the offset tool T.

When the line L3, which is the outer shape of the offset tool T, is separated from the line L1, which is the finished shape of the groove Da, by a uniform distance (that is, the offset amount o), the offset tool T is said to be at a reference position. At this time, a reference point Ot of the offset tool T coincides with a reference point Od of the turbine disk D. A reference symbol C denotes an imaginary circle with the reference point Od of the turbine disk D as its center and the offset amount o as its radius. When the offset tool T is moved parallel to a given direction (for example, the X-axis direction) so as to position the reference point Ot of the offset tool T on the imaginary circle C, a plurality of points on the line L3, which is the outer shape of the offset tool T, fall on the line L1, which is the finished shape of the groove Da. When the direction of movement of the offset tool T is changed freely so as to position the reference point Ot of the offset tool T at a given position elsewhere on the imaginary circle C, a plurality of different points on the line L3, which is the outer shape of the offset tool T, fall on a plurality of different points on the line L1, which is the finished shape of the groove Da.

Therefore, by moving the offset tool T parallel within the X-Z plane so as to move the reference point Ot of the offset tool T through 360° on the imaginary circle C, all the positions on the line L1, which is the finished shape of the groove Da, necessarily come into contact with some part of the line L3, which is the outer shape of the offset tool T, at least once.

By the use of this principle, all portions of the groove Da can be cut up to the line L1, which is the finished shape, with good precision by means of the offset tool T.

Terms used here are defined as follows: 'feeding' means that the offset tool T is moved on the Z-X plane relative to the turbine disk D from a state (reference position) in which the reference point Ot coincides with the reference point Od of the turbine disk D to a state in which the reference point Ot of the offset tool T is at a given position on the imaginary circle C. Furthermore, 'incising' means that the offset tool T is moved on the Z-X plane relative to the turbine disk D so that the reference point Ot moves along the imaginary circle C. Moreover, 'cutting' means that, in order to cut the machining allowance of the groove Da by means of the offset tool T, the offset tool T is moved in the Y-axis direction relative to the turbine disk D.

The operation of the embodiment of the present invention having the above-mentioned arrangement is now explained.

'Feeding' or 'incising', in which the offset tool T is moved relative to the turbine disk D within the X-Z plane, is possible by controlling in synchronism with each other movement in the Z-axis direction of the spindle head 13 supporting the offset tool T and movement in the X-axis direction of the slide table 14 supporting the turbine disk D. Furthermore, 'cutting', in which the offset tool T is moved in the Y-axis direction relative to the turbine disk D, is possible by moving the indexing platen 14 integrally with the slide table 12 in the Y-axis direction. Moreover, 'indexing', in which, among a plurality of grooves Da of the turbine disk D, a groove Da that is to be machined is positioned at a predetermined machining position, is possible by rotating the turbine disk D retained by the jig 15 of the indexing platen 14 by a predetermined angle at a time around the axis parallel to the Y axis.

Figure 5:
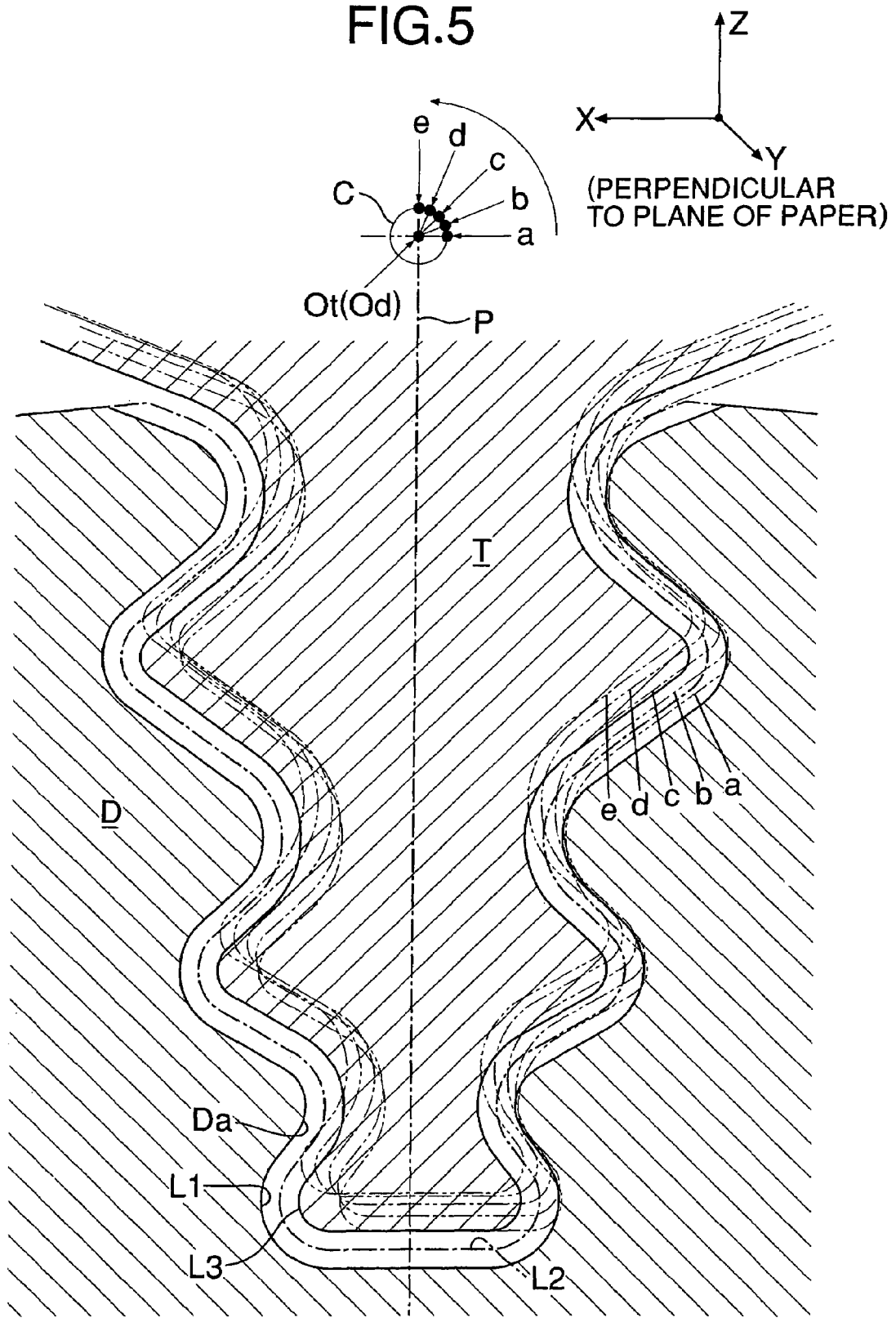
FIG. 5 is a diagram for explaining the operation when a reference point of the offset tool is moved within a first quadrant of an imaginary circle.

In a state prior to machining the groove Da of the turbine disk D, as shown in FIG. 4, the offset tool T is at the reference position, in which the line L3 for its outer shape is separated from the line L1, which is the finished shape of the groove Da, by a uniform distance (that is, the offset amount o). From this state, as shown in FIG. 5, 'feeding' of the offset tool T is carried out by moving the reference point Ot of the offset tool in a given direction (in the embodiment, the X-axis direction) within the X-Z plane only by the offset amount o so that the reference point Ot coincides with a point a on the imaginary circle C. Since 'feeding' is carried out while the offset tool T is at a position away from an end face of the turbine disk D in the Y-axis direction, the offset tool T does not cut the groove Da. As a result of 'feeding', the line L3, which is the outer shape of the offset tool T, lies on top of the line L1, which is the finished shape of the groove Da, at a plurality of points when viewed in the Y-axis direction.

Subsequently, by carrying out 'cutting' of the machining allowance of the groove Da by moving the offset tool T in the Y-axis direction, the line L1 of the finished shape is obtained at said plurality of points. In practice, since the machining allowance, which is to be removed by the 'cutting' above, has a very large thickness of 0.15 mm, it is difficult to cut with one 'feeding'. Therefore, by dividing the 'feeding' so that it is carried out a plurality of times with, for example, a pitch of 0.05 mm, and carrying out 'cutting' each time in the Y-axis direction, it is possible to reduce the cutting load imposed on the offset tool T and enhance the finishing precision.

As described above, when 'cutting' by 'feeding' is completed, 'incising' is carried out, in which the reference point Ot of the offset tool T is moved on the imaginary circle C within the X-Z plane from the point a to a point b by only one pitch (for example, 0.05 mm) in the anticlockwise direction, and the offset tool T is then moved in the Y-axis direction so as to carry out 'cutting' of a finishing allowance of the groove Da by only 0.05 mm, thus finishing the line L1 of the finished shape at positions adjacent to said plurality of points.

Figure 6:
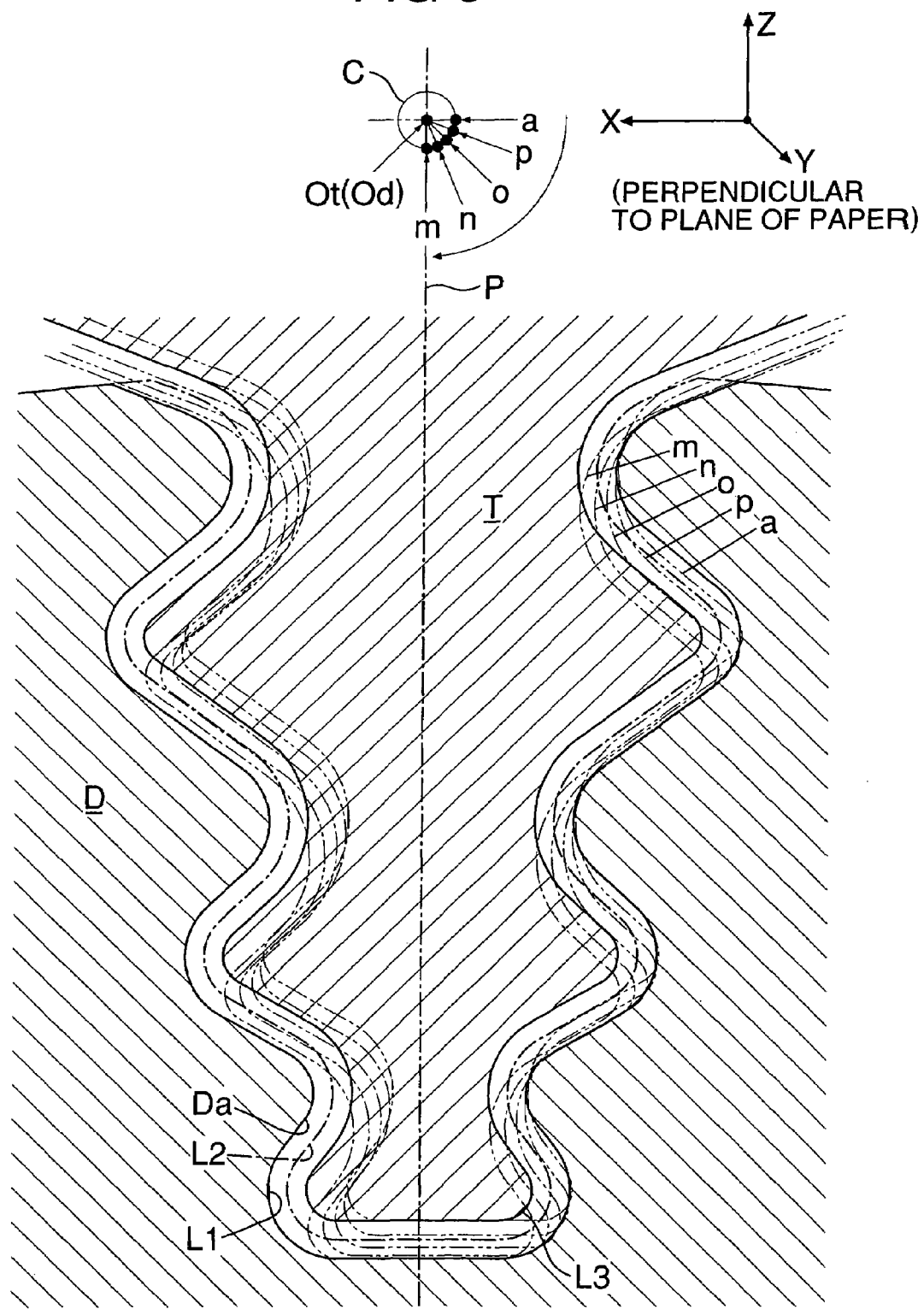
FIG. 6 is a diagram for explaining the operation when the reference point of the offset tool is moved within a fourth quadrant of the imaginary circle.

In this way, by repeating the above 'incising' and 'feeding' a plurality of times while moving the reference point Ot of the offset tool in a first quadrant of the imaginary circle C within the X-Z plane by one pitch at a time in the anticlockwise direction in the sequence point a→point b→point c→point d→point e, a quarter of the line L1 of the finished shape can be finished. Furthermore, as shown in FIG. 6, by repeating the above 'incising' and 'feeding' a plurality of times while moving the reference point Ot of the offset tool in a fourth quadrant of the imaginary circle C within the X-Z plane by one pitch at a time in the anticlockwise direction in the sequence point m→point n→point o→point p→point a, another quarter of the line L1 of the finished shape can be finished. Therefore, by repeating the above 'incising' and 'feeding' a plurality of times while moving the reference point Ot of the offset tool across the entire region of the imaginary circle C within the X-Z plane by one pitch at a time, the entire line L1 of the finished shape can be finished.

Figure 7:
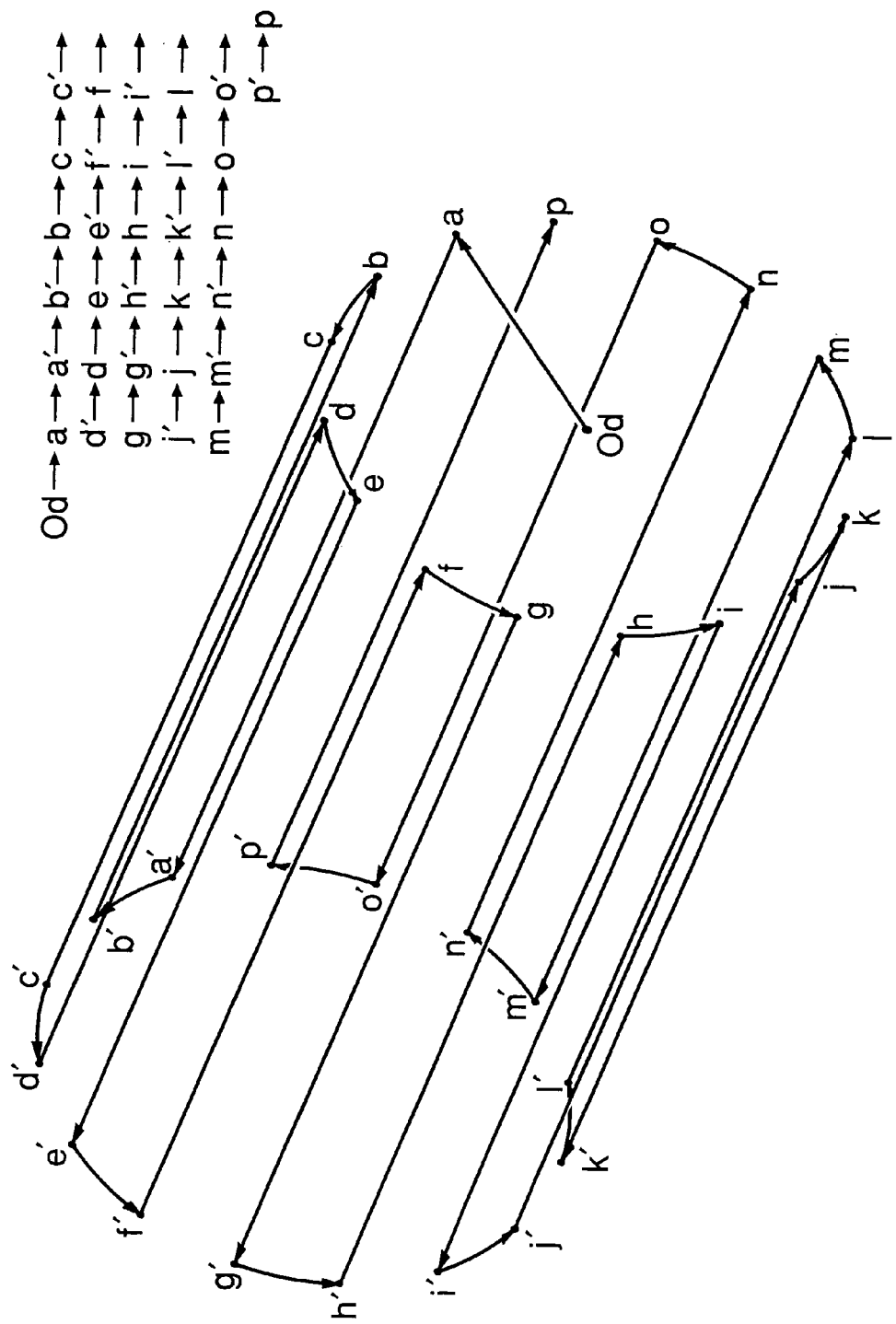
FIG. 7 is a schematic view showing an offset tool movement path.

FIG. 7 shows the path via which the offset tool T is moved. First, 'feeding', in which the reference point Ot of the offset tool T is moved within the X-Z plane from the reference point Od of the turbine disk D to the point a on the imaginary circle C, is carried out, and subsequently 'cutting', in which the reference point Ot of the offset tool T is moved in the Y-axis direction to point a', is carried out. Since the cutting load of 'cutting' accompanying 'feeding' is large, as described above, in practice 'feeding' is divided and carried out a plurality of times, and 'cutting' is carried out correspondingly each time.

Subsequently, while carrying out 'incising', in which the reference point Ot of the offset tool T is moved by one pitch at a time on the imaginary circle C, the 'cutting' corresponding thereto is carried out, thus finish machining the groove Da of the turbine disk D. In this method, 'cutting' is carried out in both outward and return directions of the offset tool T. That is, the reference point Ot of the offset tool T moves via the path point a→point a'→point b'→point b→point c→point c'→point d'→point d→point e→point e'→point f'→point f→point g→point g'→point h'→point h→point i→point i'→point j'→point j→point k→point k'→point l'→point l→point m→point m'→point n'→point n→point o→point o'→point p'→point p. Among the above-mentioned steps, movement on the imaginary circle C within the X-Z plane corresponds to 'incising', and movement in the Y-axis direction corresponds to 'cutting'.

Figure 9:
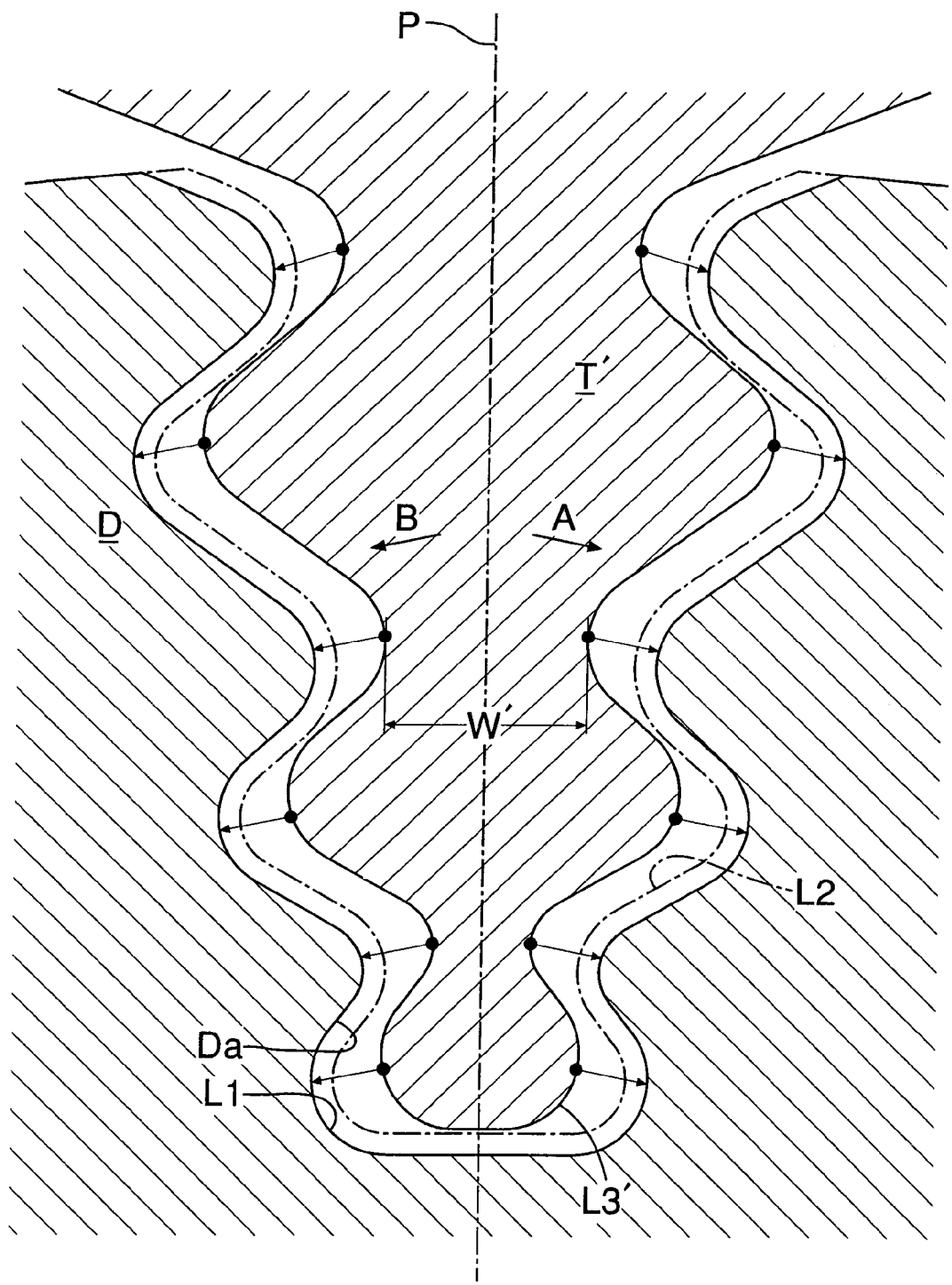
FIG. 9 is a diagram showing the shapes of a groove of a turbine disk and a forming tool.

FIG. 9 shows a comparative example in which a groove Da having a line L1 of the finished shape is cut using a forming tool T' having a line L3' as an outer shape. In this case the line L1, which is the finished shape of the groove Da, and the line L3', which is the outer shape of the forming tool T', have identical shapes that overlap by parallel movement. Moving the forming tool T' in the direction of arrow A allows the entire region of one outline of the groove Da to be cut, and moving the forming tool T' in the direction of arrow B allows the entire region of the other outline to be cut.

In this way, in the case of the forming tool T', since the entire region of one outline or the other of the groove Da is cut simultaneously, the cutting load is large, and it is necessary to enhance the rigidity of the machining system and the forming tool T'. Moreover, there is the problem that, in the portion of the groove Da that is the narrowest, the corresponding diameter W' of the forming tool T' is small. When the dimensions of the groove Da are large, it is possible to maintain the diameter W' to some extent, but when the dimensions of the groove Da are small, the diameter W' is small, and there is a possibility that the forming tool T' might break in that portion.

In contrast thereto, since the offset tool T of the present embodiment shown in FIG. 4 has a diameter W, corresponding to the portion of the groove Da of the turbine disk D where the width is the smallest, that is large compared with the diameter W' of the forming tool T' (see FIG. 9), even when the offset tool T is made small in order to machine a small groove Da, it is possible to prevent it from breaking.

As described above, in accordance with this embodiment, since only one part of the machining allowance of the groove Da is cut by moving the offset tool T in the Y-axis direction each time the offset tool T is moved along the imaginary circle C by a predetermined pitch at a time, compared with the forming tool, which cuts a wide region of the groove Da all at once, the load imposed on the offset tool T can be reduced. This enables the durability of the offset tool T to be enhanced and the finishing precision of a machined face of the groove Da to be improved. Moreover, since a small-sized offset tool T, for which the strength tends to be degraded, can be used, even a small groove Da that is difficult for a forming tool can be machined.

EMBODIMENT 2

Figure 8:
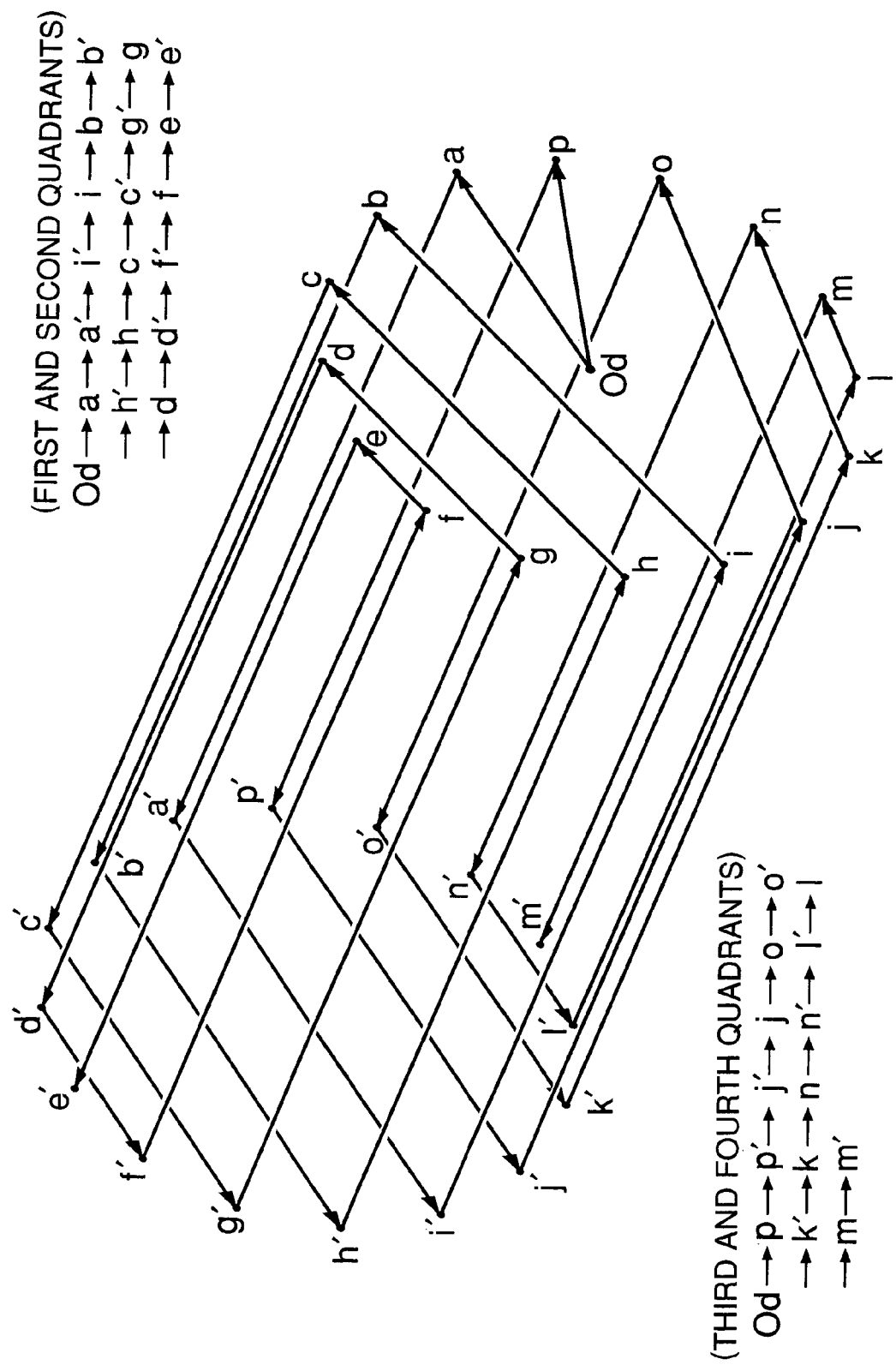
FIG. 8 is a schematic view showing an offset tool movement path related to a second embodiment.

A second embodiment of the present invention is now explained by reference to FIG. 8.

In the second embodiment, the movement path for an offset tool T is different from the movement path of the first embodiment shown in FIG. 7. In the second embodiment, an upper half of a groove Da is finish machined bilaterally symmetrically by moving a reference point Ot of the offset tool T bilaterally symmetrically within a first quadrant and a second quadrant of an imaginary circle C and, moreover, a lower half of the groove Da is finish machined bilaterally symmetrically by moving the reference point Ot of the offset tool T bilaterally symmetrically within a fourth quadrant and a third quadrant of the imaginary circle C.

Specifically, when the upper half of the groove Da is bilaterally symmetrically finish machined, the reference point Ot of the offset tool T is moved within the X-Z plane from the reference point Od of a turbine disk D to a point a on the imaginary circle C, and the reference point Ot is then moved via the path point a→point a'→point i'→point i→point b→point b'→point h'→point h→point c→point c'→point g'→point g→point d→point d'→point f'→point f→point e→point e'.

Furthermore, when the lower half of the groove Da is bilaterally symmetrically finish machined, the reference point Ot of the offset tool T is moved within the X-Z plane from the reference point Od of the turbine disk D to a point p on the imaginary circle C, and the reference point Ot is then moved via the path point p→point p'→point j'→point j→point o→point o'→point k'→point k→point n→point n'→point l'→point l→point m→point m'.

In this second embodiment, when the reference point Ot moves in each quadrant of the imaginary circle C, the offset tool T carries out cutting while always moving in the same direction along the Y-axis. In the case of the present embodiment, in the first quadrant and the fourth quadrant the offset tool T carries out cutting while moving from the nearer side in FIG. 8 toward the far side, and in the second quadrant and the third quadrant, the offset tool T carries out cutting while moving from the far side in FIG. 8 toward the nearer side.

Embodiments of the present invention are explained above, but the present invention may be modified in a variety of ways as long as the modifications do not depart from the spirit and scope of the present invention.

For example, in the embodiments machining of the groove Da for mounting the turbine blade B on the turbine disk D is explained, but as well as the turbine disk D the present invention may be applied to machining of any other workpiece.

Furthermore, the movement path for the offset tool T is not limited to the first and second embodiments, and in order to shorten the machining time while minimizing the distance moved by the offset tool T, it is desirable to carry out 'cutting' in both outward and return directions during movement along the Y-axis.

The invention claimed is:

1. A method of machining a workpiece with an offset tool, in which a groove (Da) extending in a Y-axis direction with a fixed cross-section containing a wave-shaped outline is formed by finish machining a roughly machined workpiece (D) having a predetermined machining allowance for the groove (Da) with an offset tool (T) that has a cross-section with a shape offset in a reducing direction by only a predetermined offset amount (o) relative to the wave shape and that rotates around an axis of rotation parallel to a Z axis perpendicular to the Y axis, the method comprising:

a feeding step in which the offset tool (T) is moved relative to the workpiece (D) within an X-Z plane perpendicular to the Y axis only by the offset amount (o) in a given direction from an initial position, a first cutting step in which the machining allowance is cut along the entire length of the groove (Da) while moving the offset tool (T) relative to the workpiece (D) in the Y-axis direction, an incising step in which the offset tool (T) is moved relative to the workpiece (D) within the X-Z plane only by a predetermined distance on the circumference of a circle having the initial position as the center thereof and the offset amount (o) as a radius thereof, and a second cutting step in which the machining allowance is cut along the entire length of the groove (Da) while moving the offset tool (T) relative to the workpiece (D) in the Y-axis direction, wherein the incising step and the second cutting step are repeated a plurality of times.

2. The method of machining a workpiece with an offset tool according to claim 1, wherein by repeating the feeding step and the first cutting step a plurality of times, the offset tool (T) is moved relative to the workpiece (D) within the X-Z plane perpendicular to the Y axis only by the offset amount (o) in a given direction from the initial position.

3. The method of machining a workpiece with an offset tool according to claim 1, wherein the second cutting step is carried out both when the offset tool (T) moves relative to the workpiece (D) in one direction along the Y-axis and when the offset tool (T) moves relative thereto in the other direction along the Y-axis.

4. The method of machining a workpiece with an offset tool according to claim 3, wherein the groove (Da) of the workpiece (D) is a blade-mounting groove having a Christmas tree shape.

5. The method of machining a workpiece with an offset tool according to claim 1, wherein the offset tool (T) is moved relative to the workpiece (D) within the X-Z plane by moving in synchronism a spindle head (13) that supports the offset tool (T) and is movable in the Z-axis direction and an indexing platen (14) that supports the workpiece (D) and is movable in an X-axis direction.

6. The method of machining a workpiece with an offset tool according to claim 5, wherein the workpiece (D) is a disk-shaped member comprising a plurality of radial grooves (Da) in the outer peripheral part, and is supported on the indexing platen (14) so as to be capable of rotating around an axis parallel to the Y axis.

* * * * *